United States Patent
Pettersen et al.

[11] Patent Number: 5,603,745
[45] Date of Patent: Feb. 18, 1997

[54] AGRICULTURAL COMPOSITION AND CONDITIONING AGENT FOR REDUCING HYGROSCOPICITY AND DUST FORMATION OF FERTILIZERS

[75] Inventors: Jarl M. Pettersen, Larvik; Torstein Obrestad, Ulefoss; Susanne G. Snartland, Skien, all of Norway

[73] Assignee: Norsk Hydro a.s, Oslo, Norway

[21] Appl. No.: 494,084

[22] Filed: Jun. 23, 1995

[30] Foreign Application Priority Data

Jun. 24, 1994 [NO] Norway ..................... 942419

[51] Int. Cl.⁶ .................. C05C 5/00; C05G 3/00
[52] U.S. Cl. ................ 71/58; 71/64.07; 71/64.11
[58] Field of Search ................ 71/58, 59, 64.07

[56] References Cited

U.S. PATENT DOCUMENTS 5,264,019  11/1993  Gossett, Jr. et al. ............. 71/64.07
5,310,785   5/1994  Hayakawa et al. ............... 525/7

FOREIGN PATENT DOCUMENTS 0320987  6/1989  European Pat. Off. .
0520456  12/1992 European Pat. Off. .
6-56567  3/1994  Japan .
143938   2/1981  Norway .

OTHER PUBLICATIONS

CA 101:190536, Goethals et al. 1984 Abstract of EP 84–200024.

Primary Examiner—Ferris Lander
Attorney, Agent, or Firm—Wenderoth, Lind & Ponack

[57] ABSTRACT

The invention relates to an agricultural composition and a conditioning agent. The agricultural composition comprises a substrate, being a nitrate-containing fertilizer, and 0.1–2 weight % of a coating comprising 10–50 weight % wax, 90–40 weight % oil and 1–30 weight % resin being oil-soluble and miscible with wax. The conditioning agent is useful for reducing hygroscopicity and dust formation of fertilizers. It comprises 10–50 weight % wax, 90–40 weight % oil and 1–30 weight % oil being oil soluble and miscible with wax. When applied for nitrate of lime, this agent comprises preferably 15–30 weight % wax, 70–85 weight % white oil and/or vegetable oil and/or refined mineral oil and 2–15 weight % resin, which comprises non-crystalline tall oil resin and/or esters of stabilized resin acids.

10 Claims, 2 Drawing Sheets

AGRICULTURAL COMPOSITION AND CONDITIONING AGENT FOR REDUCING HYGROSCOPICITY AND DUST FORMATION OF FERTILIZERS

The present invention relates to an agricultural composition comprising a substrate being a nitrate-containing fertilizer and 0.1–2 weight % of a coating thereon for reducing hygroscopicity and dust formation of the fertilizer. The invention further comprises a conditioning agent comprising wax and oil for obtaining coating on fertilizers.

It has been known for a long time that hygroscopic fertilizers like NP-fertilizers and especially nitrate of lime (NL) will cause problems when they are exposed to moisture. The absorbed moisture will result in caking of the particles and dust formation during handling will also increase thereby. Handling of the product in bulk will accordingly be impossible unless this problem is solved. At normal humidities this problem can be solved by application of known conditioning agents. However, at temperatures and humidities experienced in tropical and subtropical areas the problem still exists. The known conditioning agents are not sufficiently waterproof or impervious to prevent absorption of moisture unless large amounts of coating are used. But this will make the coated fertilizer particles sticky which again results in several problems.

EP0320987 B discloses a conditioning agent comprising 10–60 weight % wax, 30–90 weight % oil and 0.3–10 weight % of a high-molecular viscoelastic elastomer which is soluble in oil and has an average molecular weight of 30,000–5,000,000. The preferred wax is a mixture of paraffin wax, polyethylene wax and microcrystalline wax. Polyisobutylene is the preferred elastomer. This conditioning agent is usually applied in amounts of 0.3 weight % of the fertilizer and at normal humidities it gives excellent results even for hygroscopic fertilizers like NL. However, at humidities often occurring in tropic and subtropic areas fertilizers coated with this agent will absorb moisture in unacceptable amounts. Application of more than 0.5 weight % of the agent reduced the moisture absorption markedly, but the fertilizer became too sticky for being handled by conventional means.

The main object of the invention was to arrive at an agricultural composition comprising nitrate-containing fertilizers having reduced tendency for moisture absorption and dust formation during handling and storage of the fertilizer particles even at high humidities and temperatures occurring in tropical and subtropical areas.

Another object was to arrive at a conditioning agent that could be applied in relatively large amounts without making the fertilizer particles sticky and thereby reduce their flowability.

A further object was to arrive at a conditioning agent that was flexible within the actual operating temperatures and could be applied to the fertilizer particles by conventional coating or conditioning equipment.

Nitrate of lime is known to be rather hygroscopic and the requirements for the new conditioning agent were basically defined in view of that being necessary for a useful agent for NL. Such an agent would then most likely meet the requirements for other nitrate-containing fertilizers.

The main problem the inventors had to solve was to obtain a coating that would be waterproof or impervious under the conditions existing in tropic or subtropic areas. A conditioning agent giving such a coating on the fertilizer particles should be flexible, having a high degree of elasticity, and being non-sticky even when applied in relatively large amounts. It should further be easy to apply on the particles and should be non-toxic to the soil and plants. This latter requirement implies that the various components must be environmentally acceptable. From an economical point of view the conditioning of the fertilizer particles should be performed in one step and still the required protection of the particles should be attained. A further requirement was that the agent should be completely soluble after a few days subsequent to application of the fertilizer to the soil and that the agent would be degradable in the soil.

In view of the above stated requirements and the positive experiences with the above referred known conditioning agent which is applicable under less demanding conditions, the inventors started their investigations for an improved conditioning agent by studying the possible reasons for the shortcomings of the above known conditioning agent. It was then found that the reason for the tendency to stickiness was mainly related to the elastomer component of the agent. Accordingly, this component should be substituted with a new component having somewhat different properties. Further investigations showed that also selection of optimal wax component could be of importance. Even the oil component would be subject to change, partly in view of the substitute for the elastomer, but also in view of environmental requirements. These preliminary investigations showed that a useful conditioning agent could be based on wax, oil and an oil-soluble elastic component improving the imperviousness of the coating.

The search for an elastic oil-soluble component meeting the other above requirements resulted in further studies of various polymers and especially resins. The selection of resin was partly dependent on the oil component to be used. This component is basically a carrier or solvent for the wax and resin components, but does also have some effect on reducing the dust formation during handling of the fertilizer. The following types of oils were found to be useful in the new conditioning agent:

White oil, any of several derivatives of paraffinic hydrocarbons having moderate viscosity, low volatility and a high flash point.

Vegetable oils such as corn oil, canola oil, sunflower oil, soya oil, linseed oil or mixtures thereof.

Refined mineral oils will also be applicable, but are not recommended from an environmental point of view.

It was found that the wax component was not very critical though careful selection of this component would give optimal effects. Useful types of wax in the new conditioning agent will be:

Intermediary waxes, paraffin waxes, microcrystalline waxes, carnuba wax and vegetable waxes. Mixtures of two or more of these waxes will be an actual wax component.

Paraffin waxes can be defined as predominantly straight-chain saturated hydrocarbons with smaller proportions of branched-chain and cycloparaffinic compounds.

Intermediary waxes are mixtures of straight-chain, branched-chain and cycloparaffinic compounds, intermediate in character between those of paraffin and microcrystalline waxes.

Microcrystalline waxes are hydrocarbons of higher average molecular weight than those of paraffin waxes with a wider range of components containing a high portion of branched-chain and cycloparaffinic hydrocarbons.

In order to obtain the lowest possible congealing point, intermediary waxes are preferred. These will give a congealing point of about 37° C. compared to a congealing point of about 43° C. for a mixture of paraffinic and microcrystalline wax.

The resin component of the new conditioning agent must be soluble in the oil component and miscible with the wax component. Further it must give the resulting coating the required elasticity, without being sticky during application on the particles and during their handling and storage. The resulting coating should be hard and glassy or being able to impregnate the particle surface. Also this component must be environmentally acceptable and degradable in the soil as explained above. Within the above framework the resin component can be chosen from the following:

Synthetic resins having high molecular weight, such as cumarone-indene, pentaerythritol ester of rosin, esterified natural resins like rosin, phenolformaldehyde resins, furfuryl alcohol resins, polyester resins and polyurethane resins.

Natural resins, primarily derived from trees and shrubs, amorphous mixtures of carboxylic acids, essentially oil and terpenes. Examples of useful natural resins are rosin, congo, balsam and damar.

The most preferred resins are non-crystalline tall oil-rosin, pentaerythritol esters of stabilized resin acids and pentaerylthritol esters from polymerized rosin. Several conditioning agents constituting mixtures of the above defined waxes, oils and resins, were applied on nitrate-containing fertilizers and these were then tested with regard to dust formation, flowability and moisture absorption. It was then found that the relative amounts in weight % of the three components should be:

|  | For NL-Products | For NP-/NPK fertilizer |
| --- | --- | --- |
| Wax | 10–50 preferably: 15–30 | preferably: 20–45 |
| Oil | 90–40 preferably: 70–85 | preferably: 45–65 |
| Resin | 1–30 preferably: 2–15 | preferably: 2–15 |

Conditioning agents having the above compositions could be applied in amounts of 0.1–2 weight % of the fertilizer. Even when applied in amounts of 0.7–1 weight % the flowability of the particles was acceptable and the particles did not stick together.

The scope of the invention and its special features are as defined by the attached claims.

The invention will now be further explained in connection with the description of the figures and the examples.

Figure 1:
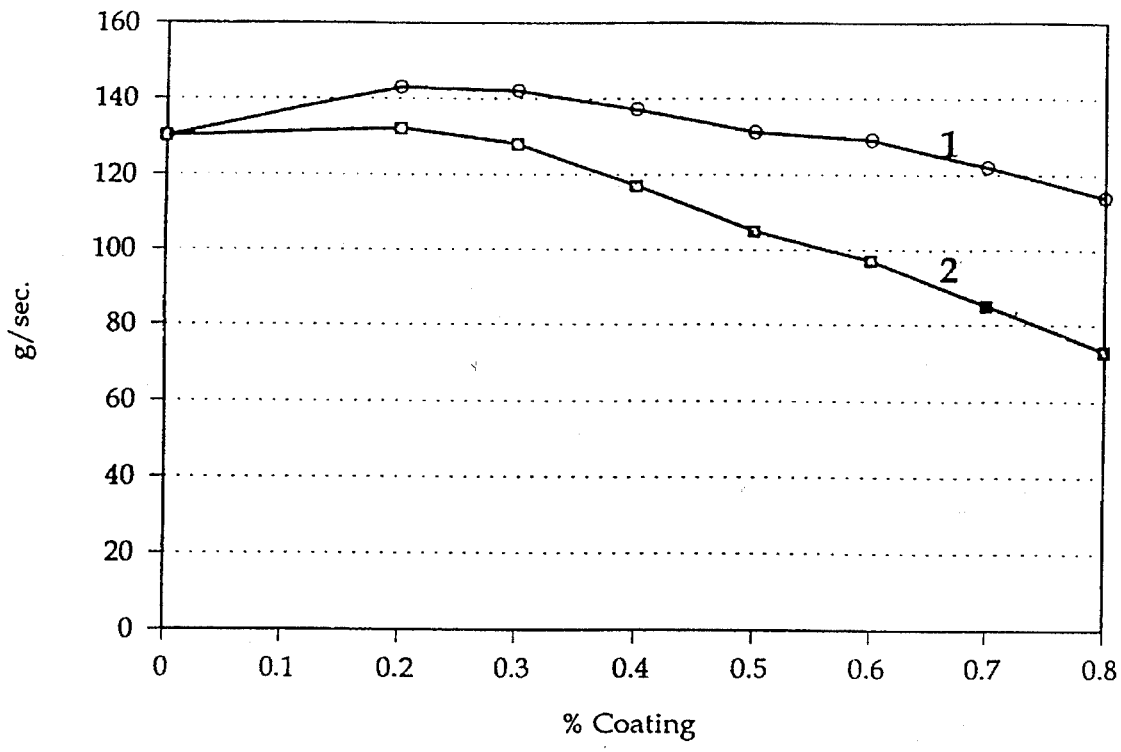
FIG. 1 shows flowability of coated NL fertilizer.

FIG. 1 shows graphically the flowability in grams/second as function of amount conditioning agent in weight % applied on NL- fertilizers. Curve 1 shows the results for NL-fertilizers on which a conditioning agent according to the invention is applied. Curve 2 shows the results for NL-fertilizer on which conditioning agent according to the above referred EP-patent is applied. These tests were performed by filling 2 kilograms of fertilizer particles in a cylinder having a diameter of 60 mm and an outlet nozzle with diameter of 20 mm. Even when 0.8 weight % of a coating according to the invention was applied, the flowability of the particles was about 90% of that recorded for uncoated particles. The flowability should be above 100 grams/sec to be acceptable.

EXAMPLE 1

Figure 2:
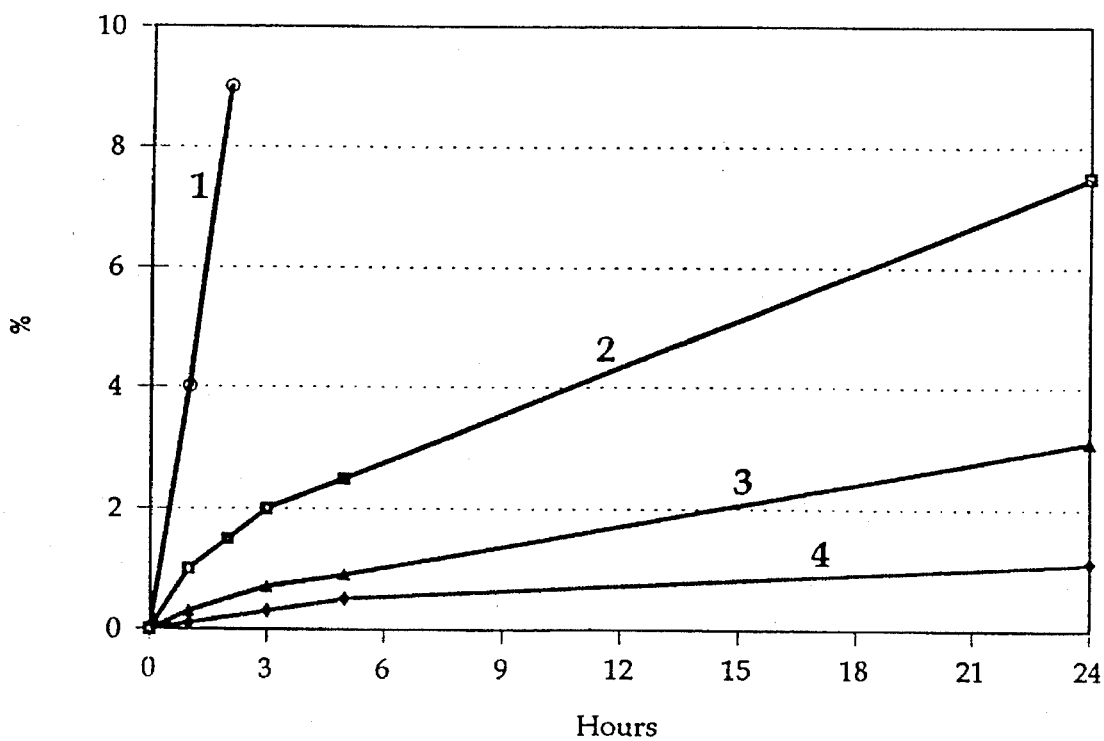
FIG. 2 shows moisture absorption of NL fertilizers.

This example shows moisture absorption of NL-fertilizer particles at 75% relative humidity and 25° C. The results of this experiment are shown in FIG. 2 as water absorbed in weight % as function of time in hours. Curve 1 refers to uncoated particles, curve 2 refers to particles having 0.3 weight % of known coating (EP-0320987 B), curve 3 refers to particles having 0.7 weight % of the known coating and curve 4 shows the results for particles having 0.7 weight % of a coating according to the invention.

The conditioning agent according to the invention applied on the particles had the following composition:
15 weight % intermediary wax
75 weight % white oil
10 weight % of esters of stabilized resin acids.

As can be seen from FIG. 2, particles to which the conditioning agent according to the invention were applied absorbed water to a far lesser degree than particles having 0.3% of the known coating and significantly less than when 0.7% of the known coating was applied. When 0.7% of the known coating was applied the particles became too sticky to be handled and therefore the conditioning agent according to the invention (curve 4) should be compared to application of 0.3% of the known coating (curve 2). NL will release liquid when 2.5–3% water is absorbed. As can be seen from FIG. 2 this will be the case when the known coating is used, but not for the product according to the present invention.

EXAMPLE 2

This example shows moisture absorption in weight % as function of time in hours for NP 20-20 fertilizer at 70% relative humidity and 25° C. The results are shown in FIG. 2 and curve 1 refers to the results for uncoated particles, curve 2 for particles having 0.15 weight % of a coating according to the invention plus 0.3 weight % powder and curve 3 shows the results for particles coated with 0.15 weight % of the coating according to the invention.

The conditioning agent according to the invention applied in this example had the following composition:
37 weight % wax 50% paraffin wax and 50% microcrystalline wax
55 weight % white oil
8 weight % resin, non-crystalline tall oil-rosin.

Figure 3:
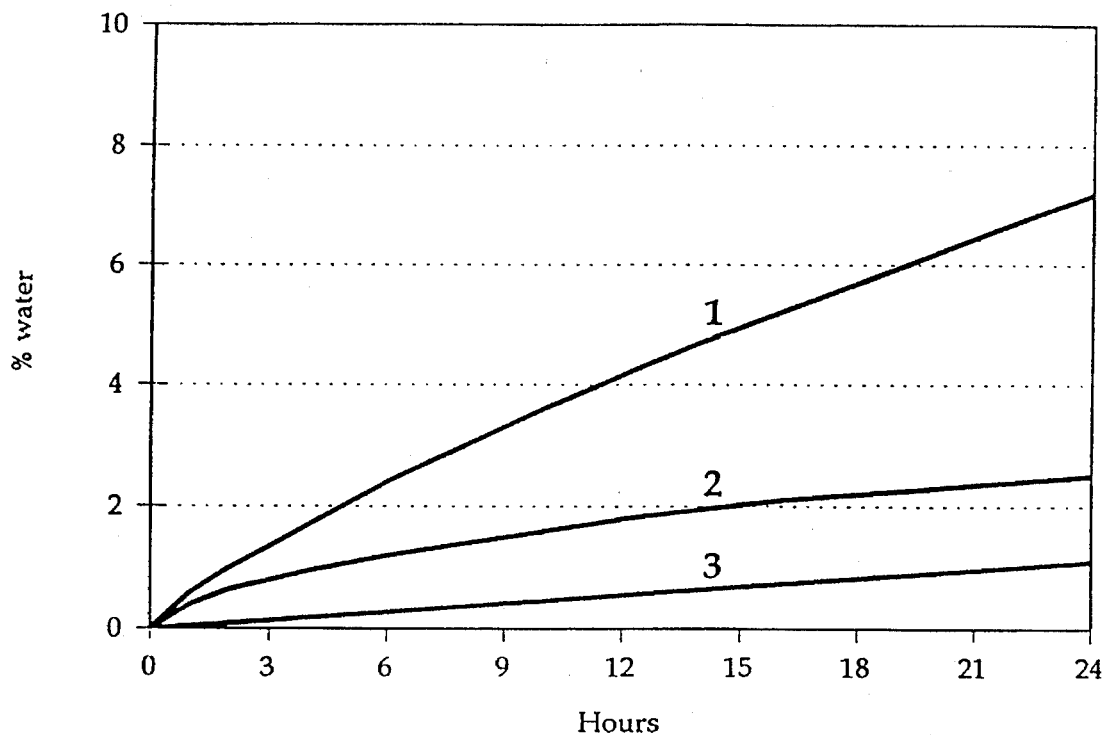
FIG. 3 shows moisture absorption of uncoated and coated NP-fertilizers.

As can be seen from FIG. 3 the moisture absorption is reduced to 15% of that of uncoated particles when the present invention is applied. This shows that the conditioning agent according to the invention also is applicable on NP-fertilizers.

EXAMPLE 3

This example shows moisture absorption in weight % at 70% relative humidity and 25° C. as function of time (hours) for a NP 20-20-fertilizer. The results are shown in FIG. 3 and curve 1 shows moisture absorption for uncoated fertilizer while curves 2 and 3 show the effect when the fertilizer particles are coated with 0.15 weight % of an agent according to the invention. In the tests shown in curve 2 0.3 weight % powder was also applied. The conditioning agent used during these experiments had the following composition:
37 weight % wax of the same type as in example 2
55 weight % white oil
8 weight % resin, pentaerithritol esters.

As shown in FIG. 3 the reduction in moisture absorption after 24 hours was about 85% compared to that of uncoated fertilizer when a coating agent according to the invention was applied. The particles were free-flowing, even without application of powder. It was further found that application of powder reduced the effect of the coating with regard to reduction in moisture absorption and increased somewhat the dust formation.

EXAMPLE 4

Figure 4:
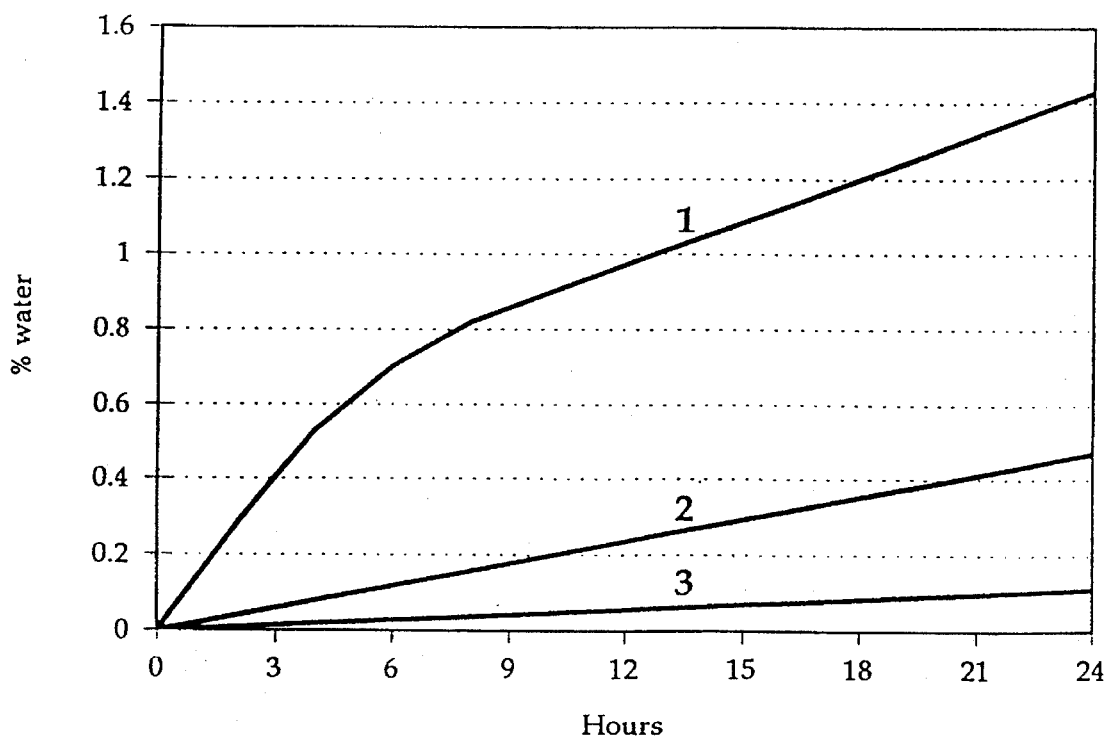
FIG. 4 shows moisture absorption of coated and uncoated NPK-fertilizers.

This example shows moisture absorption in weight % as function of time (hours) at 60% relative humidity and 25° C. for NPK 16-16-16 fertilizers. The results of the tests performed are shown in FIG. 4. Curve 1 represents the results for uncoated particles. Curve 2 shows the results for particles coated with 0.3 weight % of a known coating comprising a mixture of various waxes and mineral oil. This coating is described in Norwegian patent No. 143.938. The results obtained when 0.28 weight % of a coating according to the invention were used are shown by curve 3. The conditioning agent according to the invention applied during the tests for this example had the following composition:

Wax: 42.5 weight %, white oil: 50 weight % and resin: 7.5 weight %, pentaerithritol esters.

EXAMPLE 5

This example shows the results of a series of tests performed to see the effect on dust formation when NL-fertilizer particles were coated according to the invention.

The dust is measured in mg per kilograms of particles and gives the dust formed during wear of the particle surface subsequent to a standard tilting test. A sample of fertilizer particles were placed in a tube and tilted back and forward 40 times. This test simulates wear during bulk handling of the fertilizer and the dust number is proportional to the tendency for dust formation of the fertilizer product. Products having dust number above about 600 mg per kilogram are considered to have a great tendency for dust formation.

Uncoated NL-fertilizer has a dust number of 1500–3000. NL-fertilizer particles coated with 0.3 weight % of a coating according to the above referred EP-patent had a dust number of 100–300. When the NL-fertilizer particles were coated with 0.7 weight % of a coating according to the invention the recorded dust number was found to be 0–10.

By the present invention the inventors have succeeded in arriving at nitrate-containing fertilizers that can be handled, stored and applied in tropical and subtropical areas without giving problems with regard to caking of the particles and dust formation during handling.

The new coating agent achieved is easy to apply during the coating of the fertilizer particles. The resulting coating on the particles makes them free-flowing and non-sticky even at the high humidities and temperatures existing in tropical and subtropical areas.

The coating according to the invention will to some degree impregnate the fertilizer particles, especially when these are somewhat porous. This effect makes it possible to apply rather large amounts of coating agent on the particles. This effect is not obtained when a coating agent according to the above referred EP-patent is applied.

We claim:

1. An agricultural composition comprising a substrate being a nitrate-containing fertilizer, and 0.1–2 weight % of a coating comprising 10–50 weight % wax, 90–40 weight % oil and 1–30 weight % resin being oil-soluble and miscible with the wax.

2. Agricultural composition according to claim 1, wherein the substrate is nitrate of lime and the oil component of the coating comprises white oil and/or vegetable oil and/or refined mineral oil in amounts of 70–85 weight %, the wax component comprises 15–30 weight % and the resin component 2–15 weight % of the coating.

3. Agricultural composition according to claim 1, wherein the substrate is NP- or NPK-fertilizers and the oil component of the coating comprises white oil and/or vegetable oil and/or refined mineral oil, the wax component comprises 20–45 weight % and the resin component 2–15 weight % of the coating.

4. Conditioning agent for reducing hygroscopicity and dust formation of fertilizers, comprising 10–50 weight % wax, 90–40 weight % oil and 1–30 weight % resin being oil-soluble and miscible with the wax.

5. Conditioning agent according to claim 4, which comprises 15–30 weight % wax, 70–85 weight % white oil and/or vegetable and/or refined mineral oil and 2–15 weight % resin.

6. Conditioning agent according to claim 4, which comprises 20–45 weight % wax, 45–65 weight % white oil and/or vegetable oil and/or refined mineral oil and 2–15 weight % resin.

7. Conditioning agent according to claim 4, wherein the wax component comprises intermediary waxes, the oil component is white oil and the resin component comprises non-crystalline tall oil resin and/or esters of stabilized resin acids.

8. Conditioning agent according to claim 4, wherein the resin component comprises synthetic resins having high molecular weight.

9. Conditioning agent according to claim 4, wherein the resin is a natural resin.

10. Conditioning agent according to claim 9, wherein the natural resin is rosin.

* * * * *